(12) United States Patent
Chung et al.

(10) Patent No.: US 10,798,336 B2
(45) Date of Patent: Oct. 6, 2020

(54) CABLE CONNECTION ELEMENT FOR REDUCING SIGNAL TRANSMISSION LOSS

(71) Applicant: Signal Cable System Co., Ltd., Yilan County (TW)

(72) Inventors: Jui-Huang Chung, Yilan County (TW); Yu-Hung Lin, Yilan County (TW)

(73) Assignee: SIGNAL CABLE SYSTEM CO., LTD., Yilan County (TW)

( * ) Notice: Subject to any disclaimer, the term of this patent is extended or adjusted under 35 U.S.C. 154(b) by 180 days.

(21) Appl. No.: 16/044,889

(22) Filed: Jul. 25, 2018

(65) Prior Publication Data

US 2019/0149765 A1 May 16, 2019

(30) Foreign Application Priority Data

Nov. 10, 2017 (TW) .............................. 106216761 U

(51) Int. Cl.

| | |
|---|---|
| *H04N 7/10* | (2006.01) |
| *H01B 11/00* | (2006.01) |
| *H01R 13/66* | (2006.01) |
| *H02G 15/08* | (2006.01) |
| *H01R 11/11* | (2006.01) |
| *H01R 4/48* | (2006.01) |

(52) U.S. Cl.
CPC ............. *H04N 7/104* (2013.01); *H01B 11/00* (2013.01); *H01R 4/48* (2013.01); *H01R 11/11* (2013.01); *H01R 13/6608* (2013.01); *H02G 15/08* (2013.01); *H04N 7/106* (2013.01)

(58) Field of Classification Search
CPC ........ H04N 7/104; H04N 7/106; H01B 11/00; H01R 11/11; H01R 13/6608; H01R 13/41; H01R 13/506; H01R 13/52; H01R 13/646; H01R 13/502; H01R 4/48; H01R 9/05; H02G 15/08

USPC .................. 439/63, 578, 581, 587, 585, 345

See application file for complete search history.

(56) References Cited

U.S. PATENT DOCUMENTS

| | | | |
|---|---|---|---|
| 6,299,479 B1 * | 10/2001 | Tang ........................ | H01R 9/05 |
| | | | 439/578 |
| 6,450,836 B1 * | 9/2002 | Youtsey ................. | H01R 24/48 |
| | | | 361/119 |
| 6,595,799 B2 * | 7/2003 | Yao ........................ | H01R 24/44 |
| | | | 439/578 |

(Continued)

*Primary Examiner* — Angel R Estrada
(74) *Attorney, Agent, or Firm* — Thomas | Horstemeyer, LLP

(57) ABSTRACT

A cable connection element for reducing signal transmission loss includes a front clad, a base and a connection terminal. The connection terminal has a first core-holding portion formed on a front end thereof, a second core-holding portion formed on a rear end thereof, a core-clamping portion formed between the first and second core-holding portions, and a pin formed on a rear end of the second core-holding portion. The second core-holding portion is fixed inside the base. The front clad is connected with the base to enclose the first core-holding portion therein. When a core of a cable penetrates the front clad, the core is held by the core-clamping portion and is electrically connected therewith, such that signals from the core can be transmitted to the pin through the core-clamping portion and the second core-holding portion. Accordingly, signal transmission loss arising from capacitance effect can be improved.

5 Claims, 10 Drawing Sheets

(56) References Cited

U.S. PATENT DOCUMENTS

| | | | |
|---|---|---|---|
| 6,755,665 B2* | 6/2004 | Lu | H01R 9/0506 439/550 |
| 2003/0181073 A1* | 9/2003 | Nagano | H01R 13/41 439/63 |
| 2016/0006145 A1* | 1/2016 | Goebel | H01R 13/6581 439/345 |

* cited by examiner

CABLE CONNECTION ELEMENT FOR REDUCING SIGNAL TRANSMISSION LOSS

BACKGROUND OF THE INVENTION

1. Field of the Invention

The present invention relates to a cable connection element and, more particularly, to a cable connection element for reducing signal transmission loss.

2. Description of the Related Art

Owing to rapid development of electronic industry, more and more electronic devices are brought to market and in turn require adequate cable connection elements for different electronic devices to connect to each other and exchange signals thereof. With reference to FIGS. 9 and 10, a conventional cable connection element 80 is applied to a Cable TV (CATV) splitter and is connected with a cable terminal 90.

The cable connection element 80 includes a base 81, a front clad 82 and a connection terminal 83. The connection terminal 83 is mounted through the base 81 with a rear end of the connection terminal 83 protruding beyond a rear portion of the base 81. A rear end of the front clad 82 is coupled to a front portion of the base 81, and the front clad 82 is mounted around a front end of the connection terminal 83 to enclose the front end of the connection terminal 83.

The connection terminal 83 has a body 831, a first elastic leg 832 and a second elastic leg 833. A rear portion of the body 831 is mounted through the rear portion of the base 81. Rear ends of the first elastic leg 832 and the second elastic leg 833 are securely mounted on a front portion of the body 831. Front ends of the first elastic leg 832 and the second elastic leg 833 extend forwards and are bent rearwards to form a first hook portion 8321 and a second hook portion 8331 respectively. The first hook portion 8321 and the second hook portion 8331 elastically abut against each other. When a core 91 of the cable terminal 90 is mounted between and held by the first hook portion 8321 and the second hook portion 8331, the core 91 is electrically connected with the first hook portion 8321 and the second hook portion 8331 for signals to be transmitted from the core 91 to the first hook portion 8321 and the second hook portion 8331 and further to the body 831.

However, capacitance effect arising from the shape of the first hook portion 8321 and the second hook portion 8331 upon signal transmission leads to signal transmission loss and deteriorates performance of signal transmission through the cable connection element 80.

SUMMARY OF THE INVENTION

An objective of the present invention is to provide a cable connection element for reducing signal transmission loss that directly and electrically connects with a cable terminal and transmits signals through the terminal thereof to avoid the issue of signal transmission loss arising from capacitance effect caused by bending and suspending structure for fixing the cable core and increase operational efficiency upon signal transmission.

To achieve the foregoing objective, the cable connection element for reducing signal transmission loss includes a front clad, a base and a connection element.

The front clad has a receiving chamber and a first through hole.

The receiving chamber is formed through a rear end of the front clad.

The first through hole is formed through a front end of the front clad to communicate with the receiving chamber.

The base has a front portion, a rear portion and a second through hole.

The front portion is coupled to the rear end of the front clad.

The second through hole is formed through the front portion and the rear portion.

The connection terminal has a first core-holding portion, a second core-holding portion, a core-clamping portion and a pin.

The first core-holding portion is formed on a front end of the connection terminal and has a first core-receiving hole.

The second core-holding portion is formed on a rear end of the connection terminal and has a second core-receiving hole.

The core-clamping portion is connected between the first core-holding portion and the second core-holding portion.

The pin is formed on and protrudes rearwards from a rear end of the second core-holding portion.

The pin of the connection terminal penetrates through the front end and the rear end of the base with the second core-holding portion fixed inside the base, the front end of the connection terminal mounted inside the receiving chamber of the front clad, and the first core-receiving hole corresponding to the first through hole.

According to the foregoing structure, a cable terminal sequentially penetrates through the first through hole, the first core-receiving hole, the core-clamping portion and the second core-receiving hole, such that the cable terminal is held on the connection terminal by the core-clamping portion as a bridge for electrical connection, and after transmitted to the core-clamping portion, signals from the cable terminal can be directly transmitted to the second core-holding portion and then out from the pin. In contrast to conventional technique, the core-clamping portion has no bending and suspending structure, thereby eliminating the capacitance effect that affects signal transmission and thus raising operational efficiency upon signal transmission.

Other objectives, advantages and novel features of the invention will become more apparent from the following detailed description when taken in conjunction with the accompanying drawings.

DETAILED DESCRIPTION OF THE INVENTION

Figure 1:
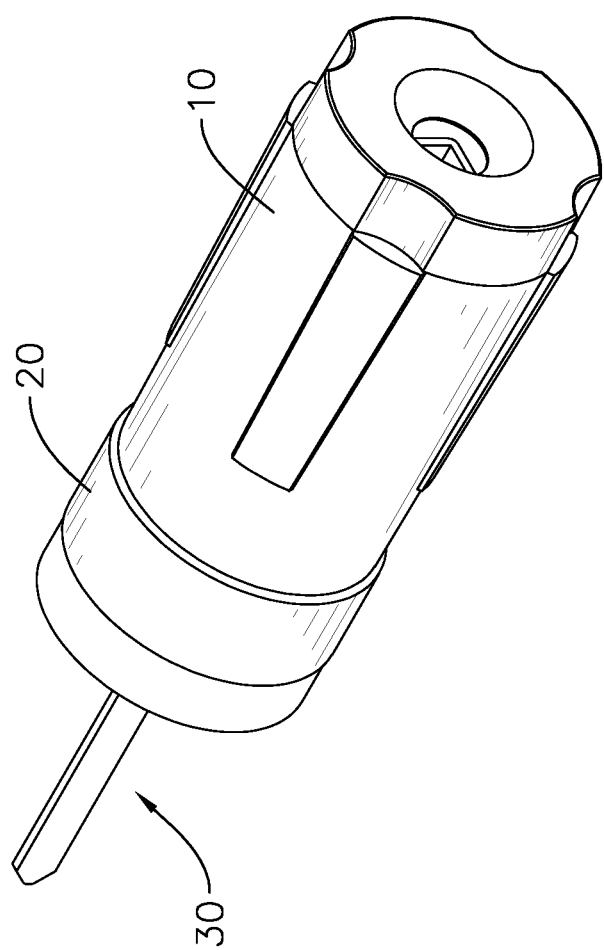
FIG. 1 is a perspective view of a cable connection element in accordance with the present invention.
Figure 2:
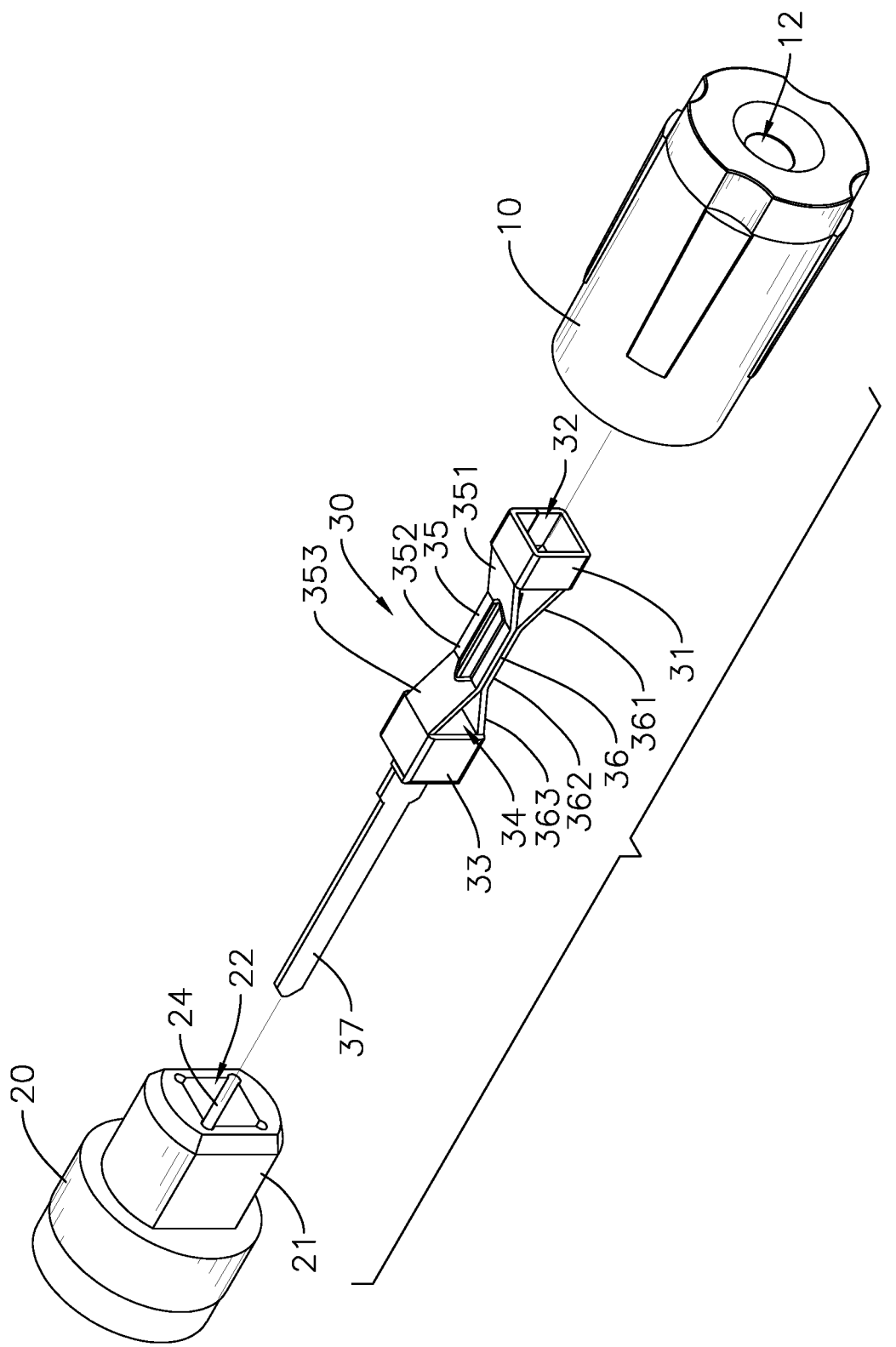
FIG. 2 is an exploded perspective view of the cable connection element in FIG. 1.

With reference to FIGS. 1 and 2, a cable connection element for reducing signal transmission loss in accordance with the present invention includes a front clad 10, a base 20 and a connection terminal 30. The connection terminal 30 is mounted through the base 20 with a rear end of the connection terminal 30 protruding beyond a rear portion of the base 20. A rear end of the front clad 10 is coupled to a front portion of the base 20, and the front clad 10 is mounted around a front end of the connection terminal 30 to enclose the front end of the connection terminal 30. In the present embodiment, the cable connection element is applied to connect a cable and an electric appliance, such as a CATV splitter.

Figure 3:
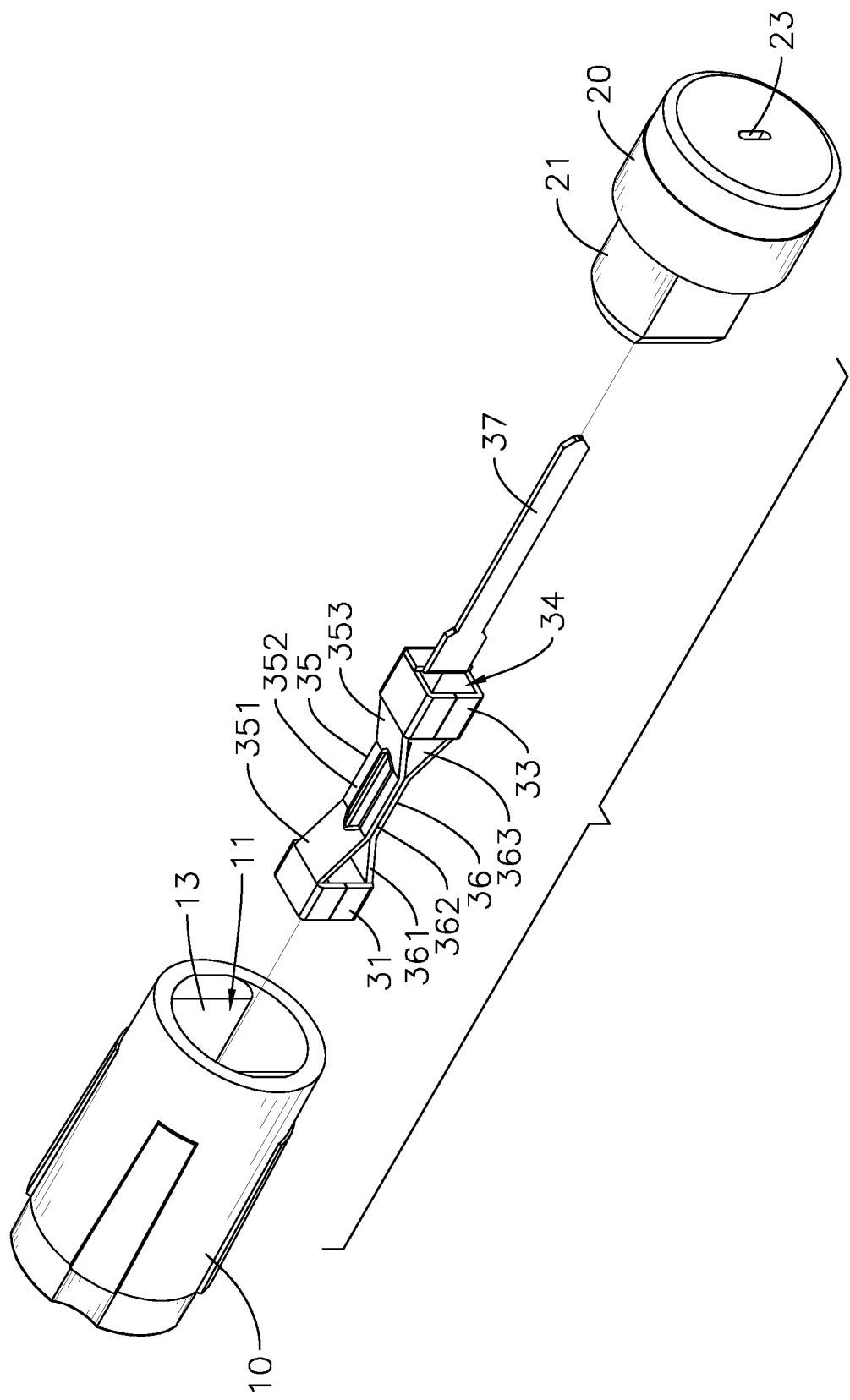
FIG. 3 is another exploded perspective view of the cable connection element in FIG. 1.

With reference to FIGS. 2 and 3, the front clad 10 has a front end and a rear end with a receiving chamber 11 formed through the rear end and a first through hole 12 formed through the front end to communicate with the receiving chamber 11.

In the present embodiment, the receiving chamber 11 is a square chamber, and two positioning portions 13 are formed on two parallel inner walls of the receiving chamber 11 for positioning the connection terminal 30 to be fitted in the receiving chamber 11.

The base 20 has a connection portion 21 and a second through hole 23. The connection portion 21 is formed on and protruding forwards from the front portion of the base 20 and has a slot 22 centrally formed through the connection portion 21. The second through hole 23 is formed through the rear portion of the base 20 to communicate with the slot 22.

In the present embodiment, the base 20 is larger than the front clad 10 in outer diameter, such that an outer diameter of the connection portion 21 of the base 20 matches an inner diameter of the receiving chamber 11 of the front clad 10. The connection portion 21 has two parallel surfaces and two curved surfaces formed around a periphery of the connection portion 21. The two parallel surfaces correspond to the respective positioning portions 13 of the front clad 10, and the two curved surfaces correspond to remaining inner walls of the receiving chamber 11, such that the base 20 can tightly engage the front clad 10 by inserting the connection portion 21 into the receiving chamber 11.

Figure 4:
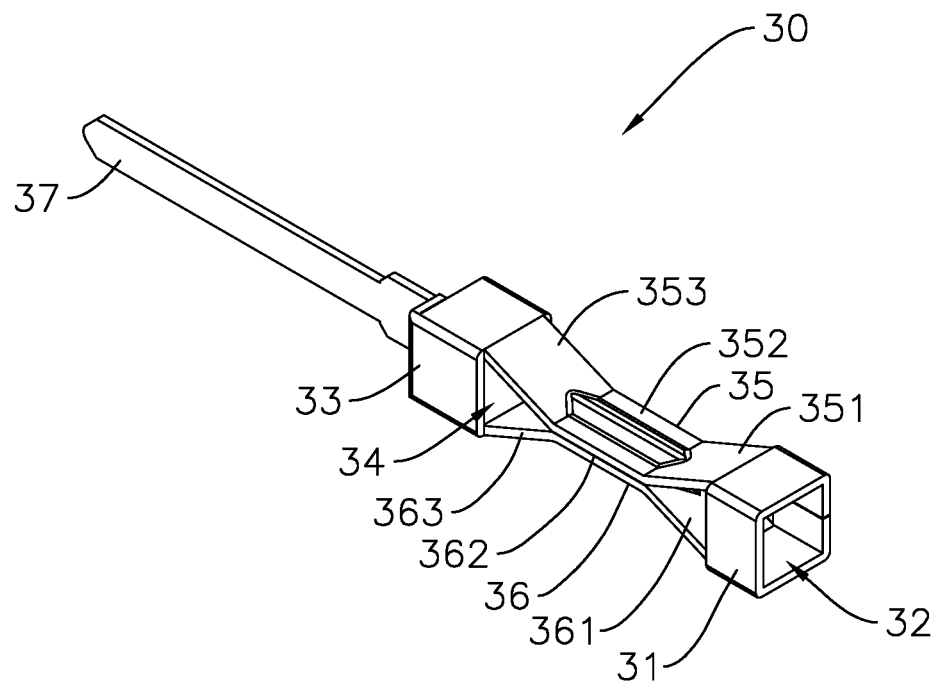
FIG. 4 is an enlarged perspective view of a connection terminal of the cable connection element in FIG. 2.

With reference to FIGS. 3 and 4, the connection terminal 30 has a first core-holding portion 31 and a second core-holding portion 33. The first core-holding portion 31 takes the form of a square ring, is formed on the front end of the connection terminal 30, and has a first core-receiving hole 32 formed through the first core-holding portion 31. The second core-holding portion 33 takes the form of a square ring, is formed on the rear end of the connection terminal 30, and has a second core-receiving hole 34 formed through the second core-holding portion 33.

In the present embodiment, the connection portion 21 of the base 20 has four glide grooves 24 respectively formed in four corners of inner walls of the receiving chamber 22 for the second core-holding portion 33 to be slidably mounted into the receiving chamber 22 through the four glide grooves 24.

The connection terminal 30 further has a core-clamping portion connected between the first core-holding portion 31 and the second core-holding portion 33 and including a first clamping piece 35 and a second clamping piece 36 mounted in parallel to each other.

The first clamping piece 35 is plate-like and resilient and has a first front section 351, a first middle section 352 and a first rear section 353. The first middle section 352 is horizontally aligned with the front clad 10 and the base 20 and is formed between the first front section 351 and the first rear section 353. The first front section 351 is obliquely connected between a front end of the first middle section 352 and a top rear edge of the first core-holding portion 31. The first rear section 353 is obliquely connected between a rear end of the first middle section 352 and a top front edge of the second core-holding portion 33. A top surface of the first core-holding portion 31 having the top rear edge is parallel to a top surface of the second core-holding portion 33 having the top front edge.

The second clamping piece 36 is plate-like and resilient and has a second front section 361, a second middle section 362 and a second rear section 363. The second middle section 362 is horizontally aligned with the front clad 10 and the base 20, is formed between the second front section 361 and the second rear section 363, and is formed on a bottom of the first middle section 22. The second front section 361 is obliquely connected between a front end of the second middle section 362 and a bottom rear edge of the first core-holding portion 31. The second rear section 363 is obliquely connected between a rear end of the second middle section 362 and a bottom front edge of the second core-holding portion 33. A bottom surface of the first core-holding portion 31 having the bottom rear edge is parallel to a bottom surface of the second core-holding portion 33 having the bottom front edge.

Figure 5:
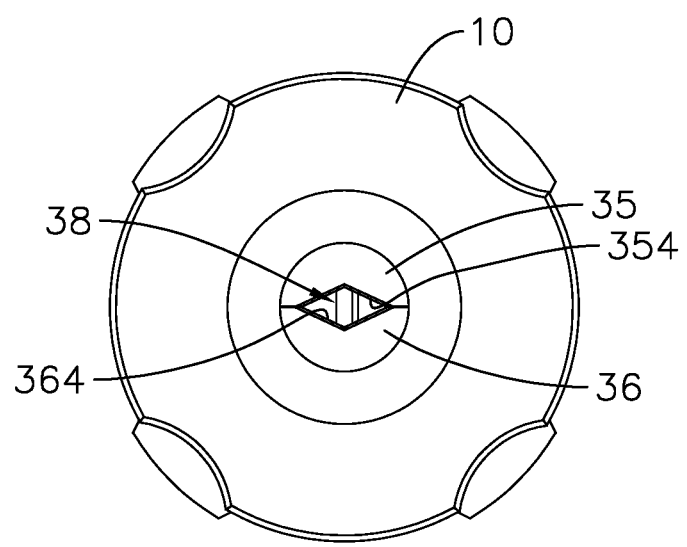
FIG. 5 is a front view of the cable connection element in FIG. 1.
Figure 6:
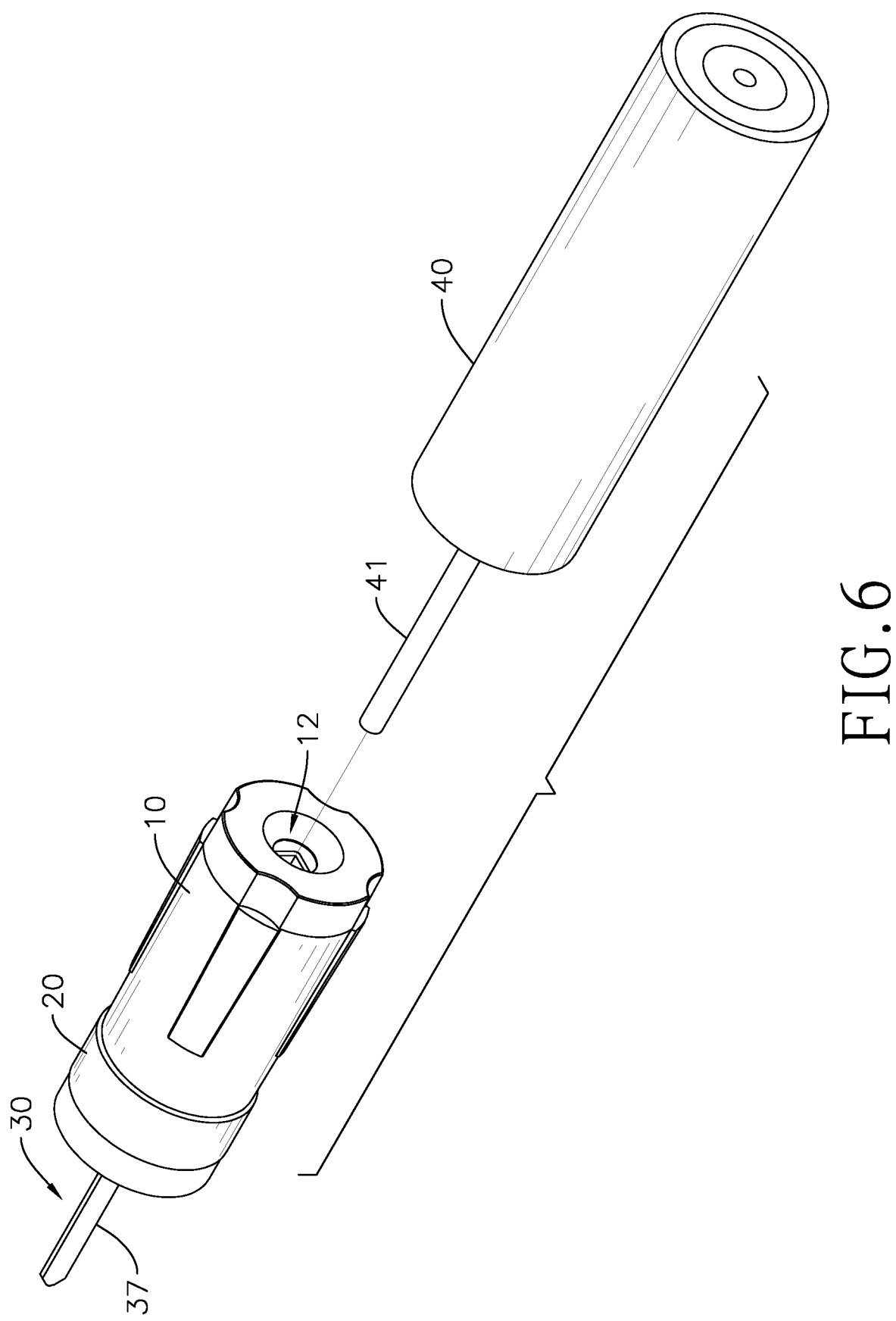
FIG. 6 is an operational perspective view of the cable connection element in FIG. 1 coupled to a cable terminal.

With reference to FIGS. 4 to 6, the first middle section 352 has a first raised portion 354 being hollow and formed on and protruding upwards from a top of the first middle section 352. The second middle section 362 has a second raised portion 364 being hollow and formed on and protruding downwards from a bottom of the second middle portion 262. Inner walls of the first raised portion 354 and the second raised portion 364 face each other and a space surrounded by the inner walls of the first raised portion 354 and the second raised portion 364 is defined as a positioning hole 38, which is smaller than a core 41 of a cable terminal 40 in diameter, for the core 41 to be inserted therein.

The connection terminal 30 further has a pin 37 formed on and protruding rearwards from a rear end of the second core-holding portion 33 to be inserted into a CATV splitter for electrical connection and signal transmission.

With reference to FIGS. 2 and 3, the pin 37 is inserted into the slot 22 of the base 20 and the second through hole 23 to partially extend beyond the second through hole 23. Meanwhile, the four outer corners of the second core-holding portion 33 corresponding to the four glide grooves 24 are slidably mounted in the four glide grooves 24 of the base 20, and the first clamping piece 35 and the second clamping piece 36 face two inner walls of the slot 22 of the base 20 adjacent to the curved surfaces of the connection portion 21 of the base 20. The first core-holding portion 31 is further aligned with the receiving chamber 11 of the front clad 10 for the connection terminal 30 to be inserted in the front clad 10 with two positioning portions 13 of the front clad 10 vertically aligning with the first clamping piece 35 and the second clamping piece 36. The two positioning portions 13 are aligned with the respective parallel surfaces of the connection portion 21 for the connection portion 21 to be tightly fitted in the rear end of the front clad 10, such that center lines of the first through hole 12, the first core-receiving hole 32, the positioning hole 38 and the second core-receiving hole 34 are collinear.

Figure 7:
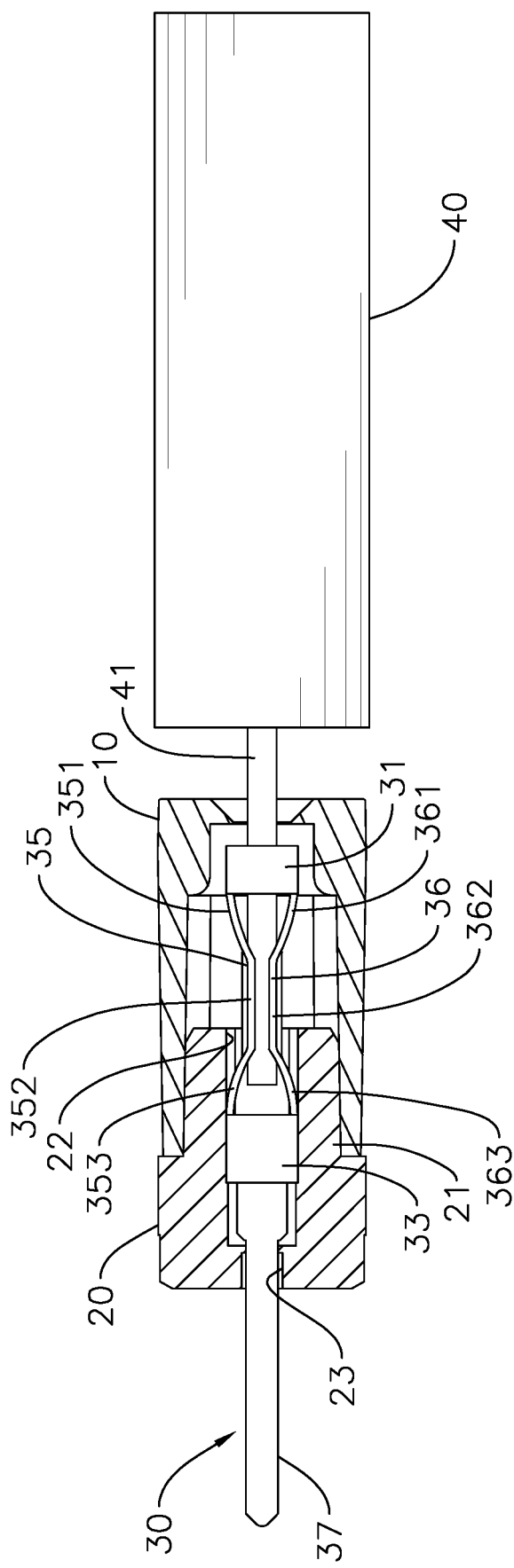
FIG. 7 is a side view in partial section of the cable connection element and the cable terminal in FIG. 6.
Figure 8:
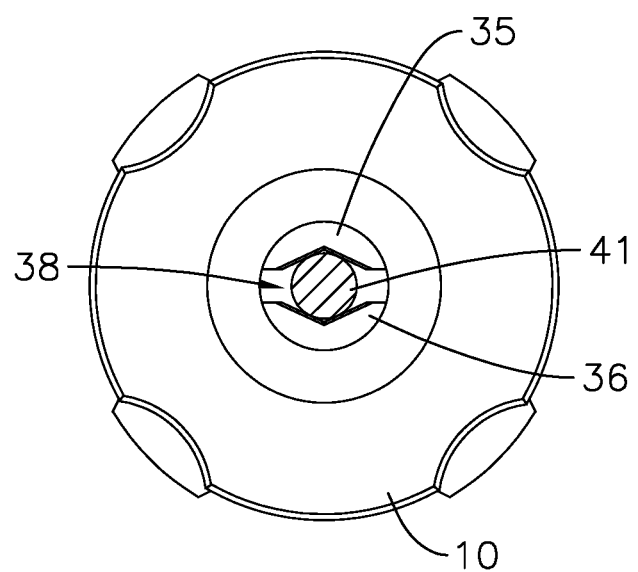
FIG. 8 is a front view in partial section of the cable connection element and the cable terminal in FIG. 6.
Figure 9:
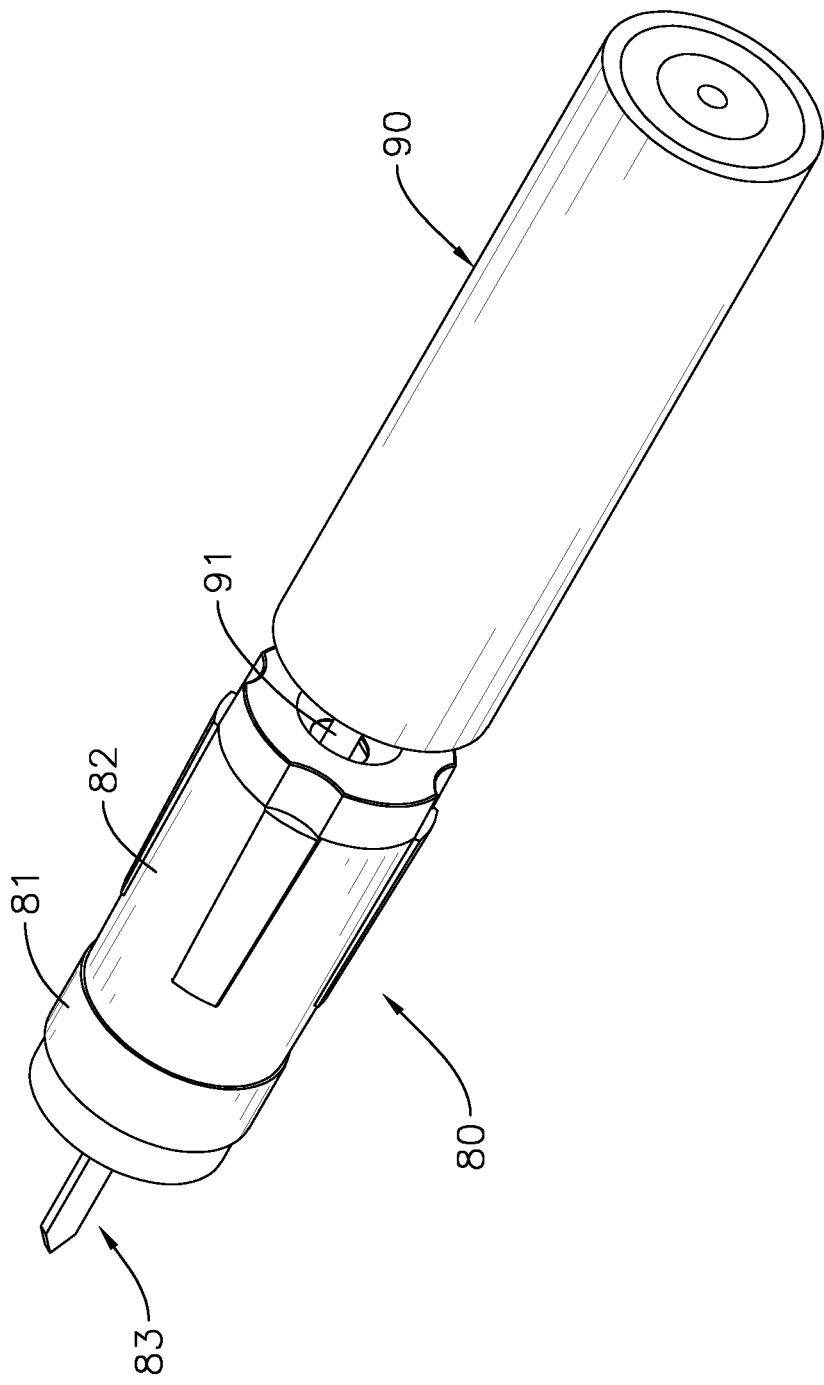
FIG. 9 is a perspective view of a conventional cable connection element coupled to a cable terminal.
Figure 10:
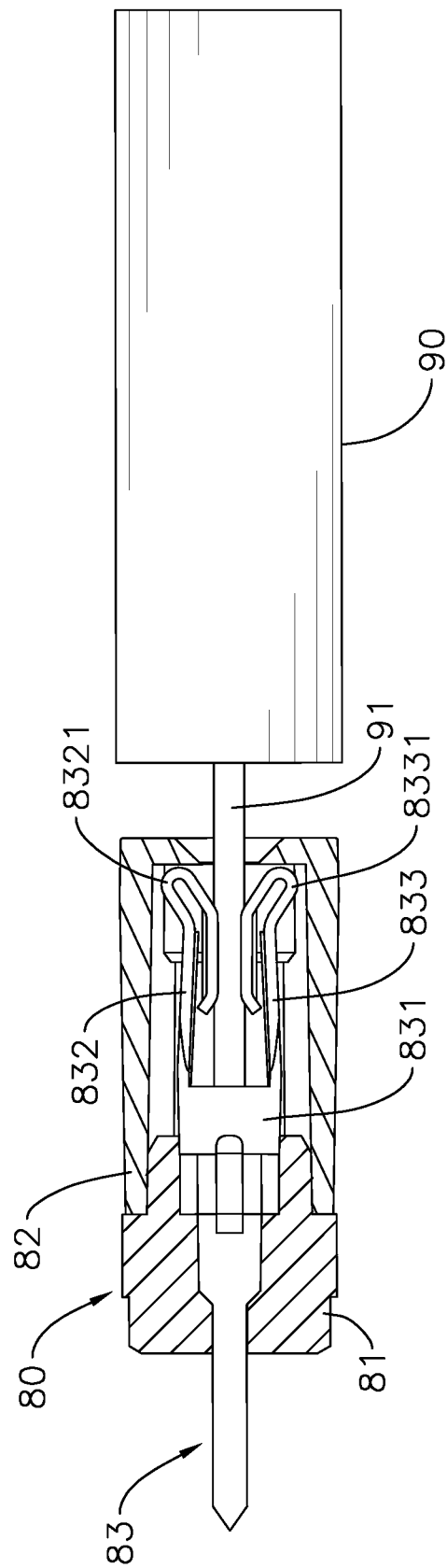
FIG. 10 is a side view in partial section of the conventional cable connection element and the cable terminal in FIG. 9.

With reference to FIGS. 2, 6 and 7, when the core 41 of the cable terminal 40 aims at the first through hole 12 of the front clad 10 and is inserted therein, the core 41 sequentially passes through the first core-receiving hole 32, the positioning hole 38 between the first clamping piece 35 and the second clamping piece 36, and the second core-receiving hole 34. The core 41 can squeeze through the positioning hole 38 and is held and fixed by the first clamping piece 35 and the second clamping piece 36, which are resilient, such that the cable terminal 40 can be coupled to the cable connection element. With reference to FIG. 8, when the core 41 is received in the positioning hole 38 between the first clamping piece 35 and the second clamping piece 36 and is electrically connected with the first clamping piece 35 and the second clamping piece 36, signals transmitted to the cable terminal 40 can be transmitted to the pin 37 and the CATV splitter sequentially through the first clamping piece 35, the second clamping piece 36, and the second core-holding portion 33.

As can be seen from the foregoing structure of the cable connection element, because the first core-holding portion 31, the first clamping piece 35, the second clamping piece 36 and the second core-holding portion 33 are directly connected to each other and none of them has any bending and suspending portion, the capacitance effect generated upon signal transmission can be effectively eliminated. Accordingly, the issue of signal transmission loss can be improved and operational efficiency upon signal transmission can be also enhanced.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A cable connection element for reducing signal transmission loss, comprising:
   a front clad having:
   a receiving chamber formed through a rear end of the front clad; and a
   first through hole formed through a front end of the front clad to communicate with the receiving chamber; a
   base having:
   a front portion coupled to the rear end of the front clad;
   a rear portion; and
   a second through hole formed through the front portion and the rear portion; and
   a connection terminal having:
   a first core-holding portion formed on a front end of the connection terminal and having a first core-receiving hole;
   a second core-holding portion formed on a rear end of the connection terminal and having a second core-receiving hole;
   a core-clamping portion connected between the first core-holding portion and the second core-holding portion; and
   a pin formed on and protruding rearwards from a rear end of the second core-holding portion;
   wherein the pin of the connection terminal penetrates through the front portion and the rear portion of the base with the second core-holding portion fixed inside the base, the front end of the connection terminal mounted inside the receiving chamber of the front clad, and the first core-receiving hole corresponding to the first through hole;
   wherein the core-clamping portion has:
   a first clamping piece being plate-like and resilient and having:
   a first middle section horizontally aligned with the front clad and the base;
   a first front section obliquely connected between a front end of the first middle section and a top rear edge of the first core-holding portion; and
   a first rear section obliquely connected between a rear end of the first middle section and a top front edge of the second core-holding portion;
   wherein a top surface of the first core-holding portion having the top rear edge is parallel to a top surface of the second core-holding portion having the top front edge; and
   a second clamping piece being plate-like and resilient and having:
   a second middle section horizontally aligned with the front clad and the base and formed on a bottom of the first middle section;
   a second front section obliquely connected between a front end of the second middle section and a bottom rear edge of the first core-holding portion; and
   a second rear section obliquely connected between a rear end of the second middle section and a bottom front edge of the second core-holding portion;
   wherein a bottom surface of the first core-holding portion having the bottom rear edge is parallel to a bottom surface of the second core-holding portion having the bottom front edge.

2. The cable connection element as claimed in claim 1, wherein
   the first clamping piece further has a first raised portion being hollow and formed on and protruding upwards from a top of the first middle section;
   the second middle section further has a second raised portion being hollow and formed on and protruding downwards from a bottom of the second middle portion;
   wherein inner walls of the first raised portion and the second raised portion face each other, a space surrounded by the inner walls of the first raised portion and the second raised portion is defined as a positioning hole, center lines of the positioning hole, the first through hole, the first core-receiving hole and the second core-receiving hole are collinear.

3. The cable connection element as claimed in claim 2, wherein
   the front clad has two positioning portions formed on two parallel inner walls of the receiving chamber;
   the base has a connection portion formed on and protruding forwards from the front portion of the base, wherein the connection portion has two parallel surfaces and two curved surfaces formed around a periphery of the connection portion, and the two parallel surfaces correspond to the respective positioning portions of the front clad.

4. The cable connection element as claimed in claim 3, wherein the connection portion of the base further has four glide grooves respectively formed in four corners of inner walls of the receiving chamber and corresponding to four outer corners of the second core-holding portion.

5. The cable connection element as claimed in claim 4, wherein an outer diameter of the connection portion of the base matches an inner diameter of the receiving chamber of the front clad, and the base is larger than the front clad in outer diameter.

\* \* \* \* \*